United States Patent
Hagan et al.

[19]

[11] Patent Number: 5,984,350
[45] Date of Patent: Nov. 16, 1999

[54] VEHICLE SAFETY SYSTEM

[75] Inventors: Willard F. Hagan; Lindsay P. Zollinger, both of Phoenix; Daniel E. Coleman, Mesa; Rick A. Adkisson; Michael C. Riley, both of Gilbert, all of Ariz.; Jack B. Meister, Convent Station, N.J.

[73] Assignee: Am-Safe, Inc., Phoenix, Ariz.

[21] Appl. No.: 09/143,756

[22] Filed: Aug. 31, 1998

Related U.S. Application Data

[63] Continuation-in-part of application No. 09/037,083, Mar. 10, 1998, abandoned
[60] Provisional application No. 60/059,430, Sep. 22, 1997.

[51] Int. Cl.⁶ ................................................ B60R 21/32
[52] U.S. Cl. ................................ 280/735; 280/733
[58] Field of Search ............................. 280/795, 806, 280/728.1, 733, 801.1; 297/480; 701/405; 244/122 AG, 122 R, 122 B

[56] References Cited

U.S. PATENT DOCUMENTS

| | | | |
|---|---|---|---|
| 3,430,979 | 3/1969 | Terry et al. | 280/150 |
| 3,888,503 | 6/1975 | Hamilton . | |
| 3,948,541 | 4/1976 | Schulman | 280/150 AB |
| 4,107,604 | 8/1978 | Bernier | 324/208 |
| 4,611,491 | 9/1986 | Brown et al. | 73/517 B |
| 4,722,573 | 2/1988 | Komohara | 297/468 |
| 4,987,783 | 1/1991 | D'Antonio et al. | 73/862.64 |
| 4,995,640 | 2/1991 | Saito | 280/804 |
| 5,026,305 | 6/1991 | Del Guidice et al. | 439/620 |
| 5,184,844 | 2/1993 | Goor | 280/733 |
| 5,194,755 | 3/1993 | Rhee et al. | 307/10.1 |
| 5,456,491 | 10/1995 | Chen et al. | 280/733 |
| 5,473,111 | 12/1995 | Hattori et al. | 174/35 R |
| 5,485,041 | 1/1996 | Meister | 307/10.1 |
| 5,597,178 | 1/1997 | Hardin, Jr. | 280/733 |
| 5,672,916 | 9/1997 | Mattes e al. | 307/10.1 |
| 5,734,318 | 3/1998 | Nitschke et al. | 340/438 |
| 5,765,869 | 6/1998 | Huber | 280/807 |

FOREIGN PATENT DOCUMENTS 0083436  3/1989  Japan ................................. 280/733

*Primary Examiner*—Eric Culbreth
*Attorney, Agent, or Firm*—Richard A. Speer; Mayer, Brown & Platt

[57] ABSTRACT

A vehicle passenger safety system for use where independent power is required. The system includes as cooperating elements: an independent source of power; a passenger restraining belt; an inflatable bag stored in the belt; crash event sensors; belt orientating structure; a source of inflating gas; and, in the preferred embodiment programmed electronics that control functioning of the safety system and prolong the service life of the independent power source.

51 Claims, 8 Drawing Sheets

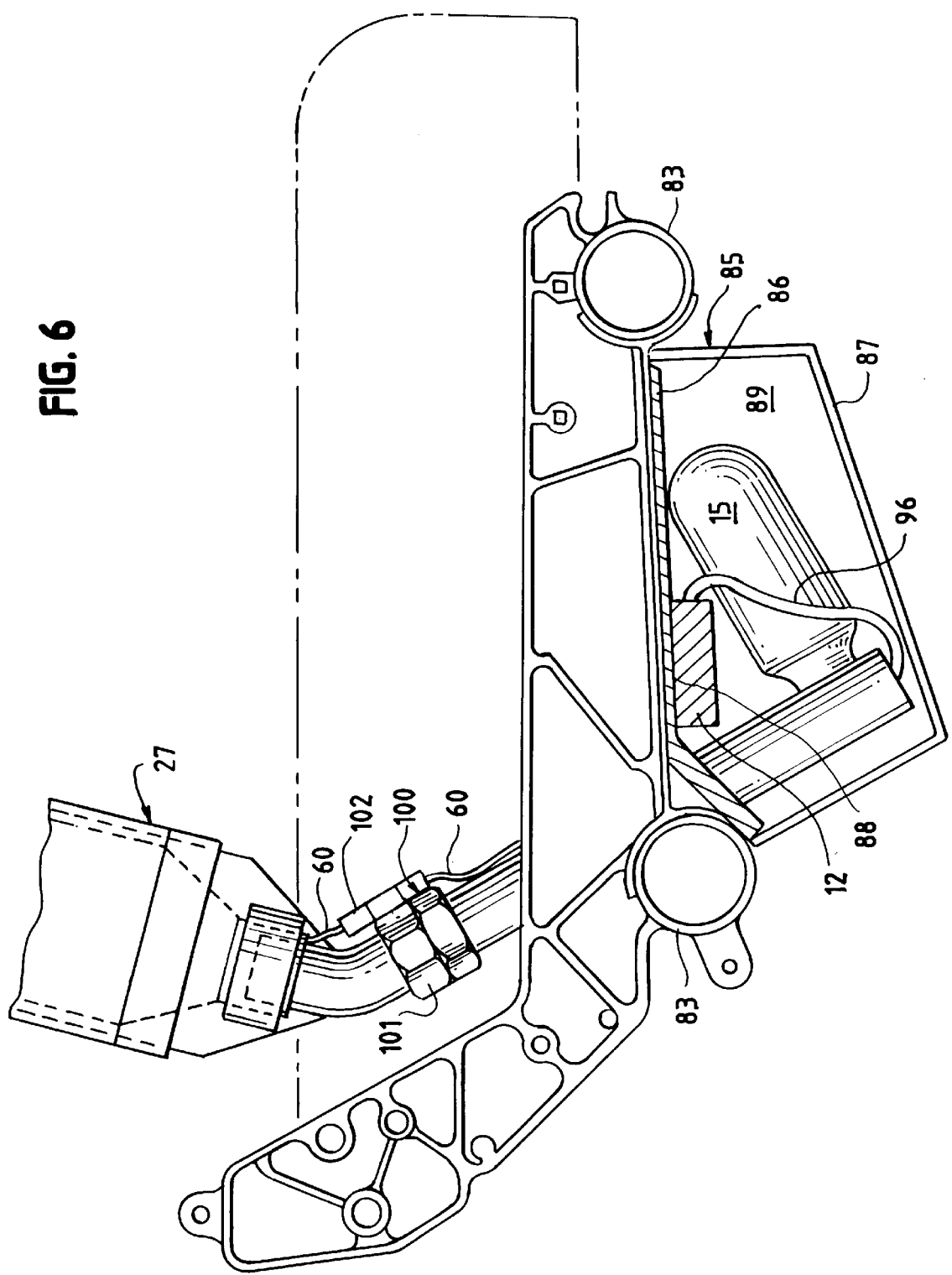

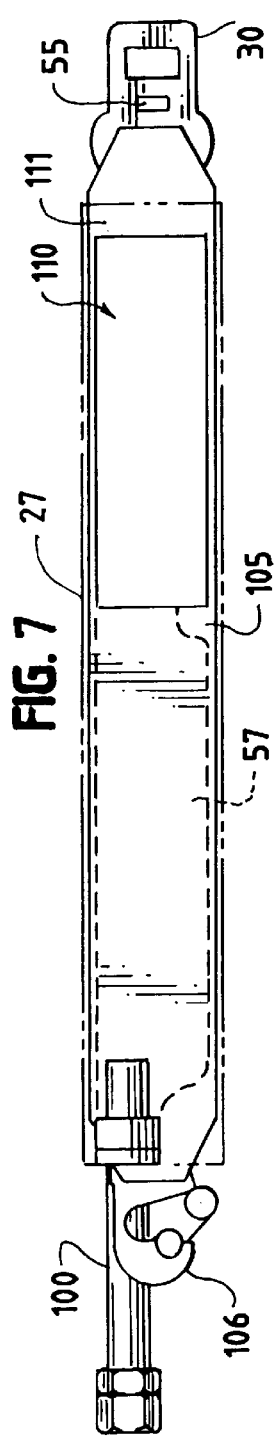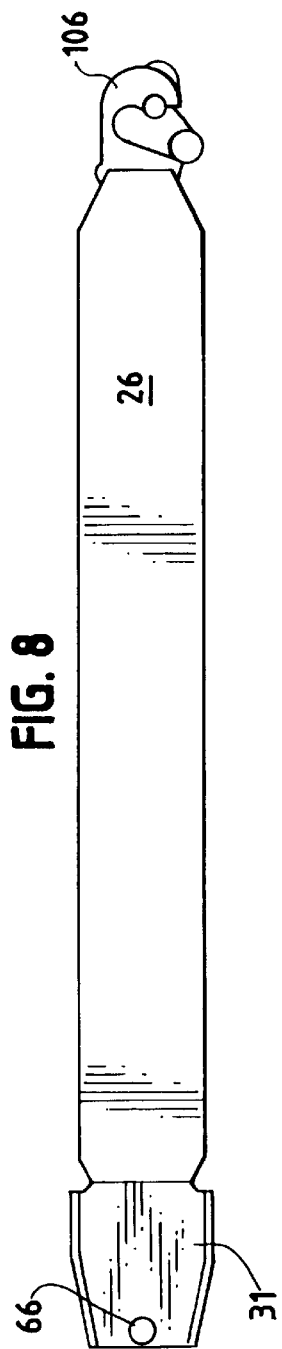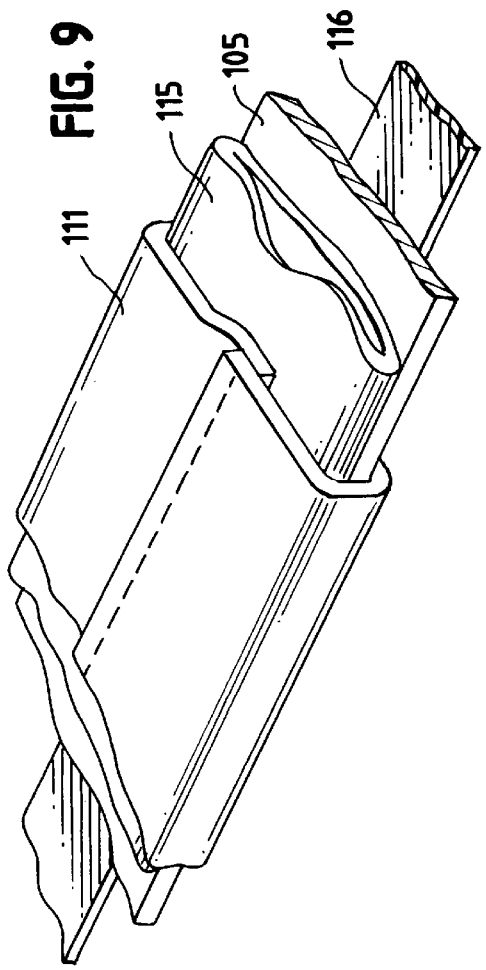

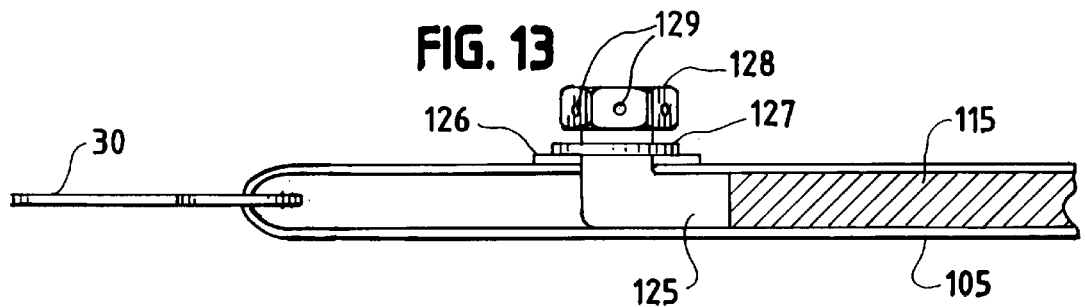
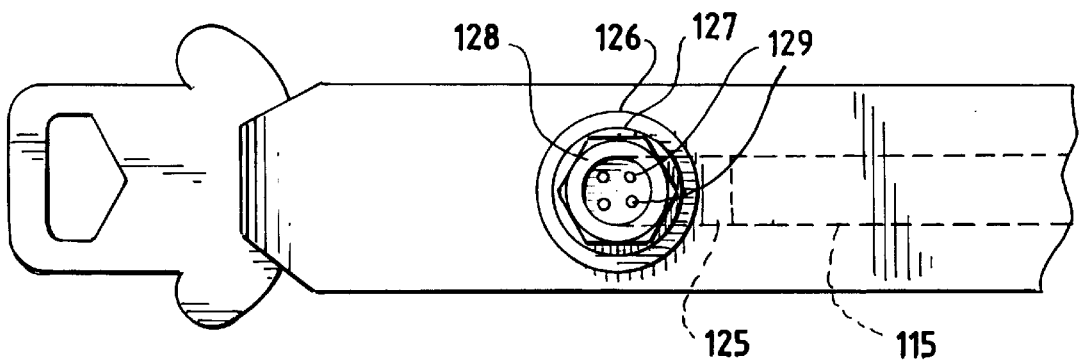
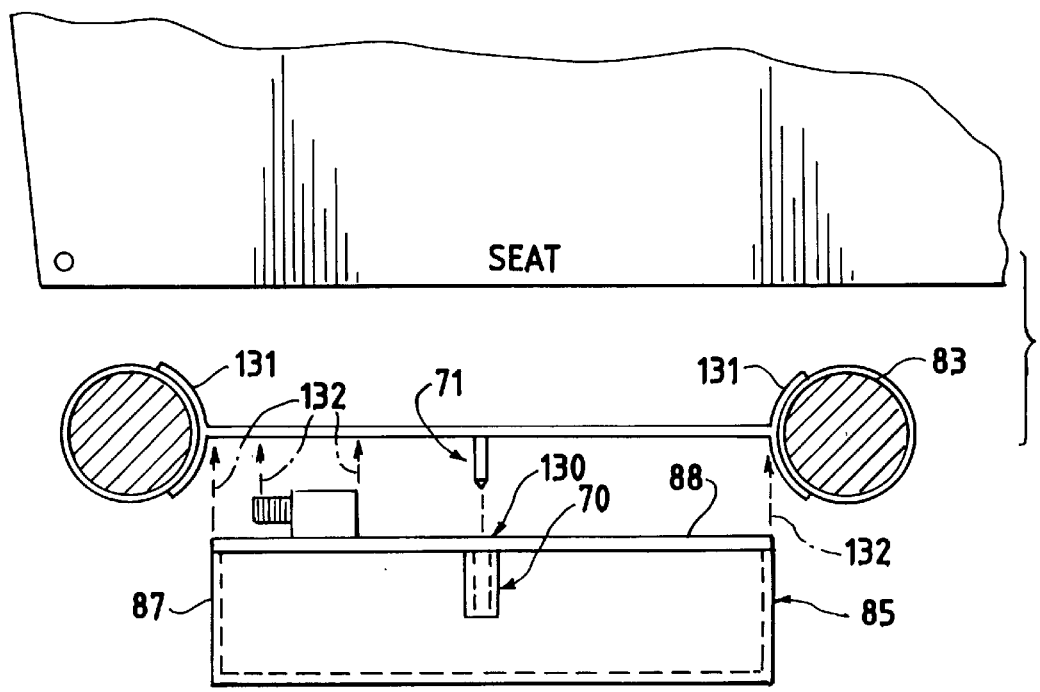

VEHICLE SAFETY SYSTEM

This application is a Continuation-In-Part of applicants application Ser. No. 09/037,083 filed Mar. 10, 1998, abandoned, which claimed the benefit of U.S. Provisional Application Ser. No. 60/059,430, filed Sep. 22, 1997.

BACKGROUND OF THE INVENTION

Passenger safety systems heretofore found in vehicles such as automobiles and aircraft have been of two principal types, specifically, seat belts and airbags. Possibly the earliest to be used was the passenger lap belt which was attached to fixed sub-structure at each end and was joined over the users lap by suitable buckling devices. Normally one of the two pieces making up the belt was of fixed length while the length of the other piece could be adjusted in order that the belt could accommodate users of all sizes. This type of belt was used for many years in automobiles and remains to this day the principal type of safety restraint used for passenger restraint in private and commercial aircraft.

At a later time, to further protect against possible injury, the lap-belts in automobiles were modified to include a shoulder strap that was attached at a third fixed point to restrain the passenger's upper torso against forward movement in a crash event. The latest significant protective equipment added was, in the case of passenger automobiles, the provision of passive restraints, or airbags. These bags, which are inflated by compressed air or other gases, are mounted in the automobile steering column and in other fixed locations within the automobile, such as the dash board and side panels. In the event of sudden deceleration of the auto, as in a crash, sensors identify the event and the compressed air or other gases are released to expand the bags at high speeds directly toward the passengers to prevent their forward movement. Airbags have proven generally effective in providing passenger protection, especially when used in conjunction with safety belt restraints.

While airbags are now common as passive restraints for front seat passengers in automobiles their use is not equally widespread in trucks and related commercial vehicles nor are they used in automobile rear seat locations. Further, the use of seat mounted airbags for passenger protection in aircraft has not occurred, for reasons having to do primarily with aircraft design and use, seat design and seat location. Seats in commercial passenger aircraft, unlike those in land vehicles, are not fixed in a permanent position but rather are movable to different locations so that, as one example, more or less space can be provided between succeeding rows and, occasionally, the seats are removed to permit an aircraft to transport cargo rather than people. In addition, the backs of aircraft seats are not rigidly mounted but, rather, they swing forward and down in a crash event, so they cannot be used to store airbags that might be protective in a crash event.

DESCRIPTION OF RELATED ART

In the past, several suggestions have been made as to how to combine the safety benefits of both belt restraints and airbags. Most suggestions have taken the form of expansible elements associated with the shoulder harnesses used in an automotive environment. For example, U.S. Pat. No. 3,888,503 illustrates a safety device 10 deployed across a person's chest and shoulder which has inflatable sections 12, 14 and 17 that are inflated under selected threshold conditions. U.S. Pat. No. 3,844,654 illustrates a safety belt system in which lap section 30 and shoulder section 32 may both be inflated when required. These s systems increase the area of the chest webbing strap and thereby possibly diffuse the forces existing between the strap and the user's torso. The fact remains, however, that this type of restraint remains basically as one requiring three attachment points to the vehicle and therefore not usable where only two points of attachment are possible, as in aircraft.

A different kind of restraint is shown in U.S. Pat. No. 3,430,979, where an automobile lap belt 9 is provided with an inflatable device which upon activation deploys a bag 17 made up of three sections 19, 21 and 23. Bag 17 is stated to inflate by an inflating mechanism 33 of any known type being activated by a sensor connected to the primary vehicle electrical system. The inflating air is transported from mechanism 33 to bag 17 through tube 51 that is exposed to damage on the exterior surface of belt 9 and where it can detract from belt is comfort and appearance. This system holds the user in position and simultaneously prevents the upper torso from being thrown violently forward in a crash event, the latter being an important protective feature.

All of the protective devices and systems discussed above involve installations that are permanent in nature, that is, they are integral to the vehicle and cannot be moved easily to other locations. Further, each system utilizes the primary source of electrical power for its functioning, which primary source is available for testing and maintenance and replacement, as required.

OBJECTS OF THE INVENTION

It is a principal object of this invention to provide a combined airbag-lap belt safety system which can be used in aircraft and also land vehicles and in which wear components can be easily repaired or replaced.

Another primary object of this invention is to provide a passenger restraint system utilizing an inflatable member and system electronics that effects selected polling of the status of crash event sensors.

Another object of this invention is to provide a combined airbag-lap belt safety system wherein the belt must be oriented with the airbag facing away from the user before the bag inflation system will operate.

An additional object of this invention is to provide a combined airbag-lap belt safety system in which the portion of the belt to which the bag is secured includes means that resists twisting of the belt.

A further object of this invention is to provide a combined airbag-lap belt safety system in which the buckle and buckle tang used to clamp the free ends of the belt about a users torso include means requiring correct orientation of the buckle and tang with respect to each other so that the airbag is on the side of the belt away from the user's body.

Still another object of this invention is to provide a combined airbag-lap belt safety system having a source of inflating gas that is operably connected to the airbag at least in part through a substantially flat tube that is contained within the belt structure.

Yet another object of this invention is to provide a combined airbag-lap belt safety system in which a crash event sensor activates circuitry that utilizes a stand alone battery power source that is independent of the vehicle power source and which through appropriate circuitry significantly extends the operating life of the safety system battery.

Yet a further object of this invention is to provide an airbag-lap belt safety system that incorporates a plurality of sources of inflating gas to enable control of the rate of bag inflation.

It is also an object of this invention to provide operating and diagnostic circuitry that enables circuit continuity to be checked and evaluated with minimal use of internal power.

A further object is to provide a safety belt/airbag combination having operating circuitry whose integrity can be cheaply and quickly monitored.

Yet an additional object is to provide an airbag actuating and inflating system that is operative only when installed in a passenger vehicle.

Other objects and advantages of this invention will be in part obvious and in part explained by reference to the accompanying specification and drawings, in which:

DESCRIPTION OF THE DRAWINGS

FIG. 6 is a view taken along the line 6—6 of FIG. 3;

FIG. 7 is a top plan view of the non-extensible portion of a lap belt on which an airbag is mounted showing the belt connecting tang and air supply elements;

FIG. 8 is a top plan view of the extensible portion of the belt showing the buckle;

FIG. 9 is a partly sectional view of the non-extensible portion of a belt with parts broken away;

FIGS. 13 and 14 are side and top plan views illustrating the layout of the gas supply tube and diffuser into the airbag; and FIG. 15 is a side view, partially sectioned illustrating a means for mounting the housing containing the electronic and gas supply to an aircraft seat.

SUMMARY OF THE INVENTION

The apparatus and system of this invention include a safety belt that is comprised of first and second lengths that are each fixed at one end to vehicle sub-structure and are connectable one to the other, at the other end at a location over a user's lap. One belt part is preferably of fixed length while the second belt length is preferably adjustable so that the combined lengths of the two belts pieces can be changed as required. In a preferred embodiment, the fixed portion of the belt contains: (i) a deployable airbag; (ii) a torsion element which positions or orients the belt so that the bag is deployed away from the user; (iii) a gas conducting tube that directs gas from a gas source to the gas bag; and (iv) an outer, protective cover assembly that is rupturable at least in the area adjacent to the gas bag to permit its expansion. The system further includes a source of gas, control and firing circuitry including electronics for identifying a crash event and a dedicated source of battery supplied electricity which is independent of the vehicle electrical power source and which in a preferred construction utilizes a polling or sampling means to significantly extend battery life. Switch means are included in belt buckle and in belt tang parts that permit system activation when the two belt lengths are oriented correctly and joined with the airbag positioned for expansion away from the user's body. Also, by positioning switch means in the buckle and tang, activation of the airbag system can be precluded by introducing an extra belt length between the tang and buckle which precludes arming of the bag system.

While the safety belt system of this invention may be, as noted earlier, used in any type of passenger vehicle, it is especially applicable in those situations where two point attachment passenger restraint belts are used as the sole means of protection, for example in aircraft and in those automotive applications where rigid structure is generally not available for airbag installation. The greatest single area of need and therefore applicability is in aircraft where there has not previously been any form of seat mounted airbag protection. Due to structure and seat layout, it has been possible neither to install passenger airbags that operate in a manner similar to those in land vehicles nor to install belts that include upper torso restraint. Thus, while the present invention can be used in all types of passenger vehicles, it will be described as applied to an aircraft environment where use of a totally dedicated independent power system, such as a battery, with adequate service life is mandatory.

DESCRIPTION OF THE PREFERRED EMBODIMENTS

Figure 1:
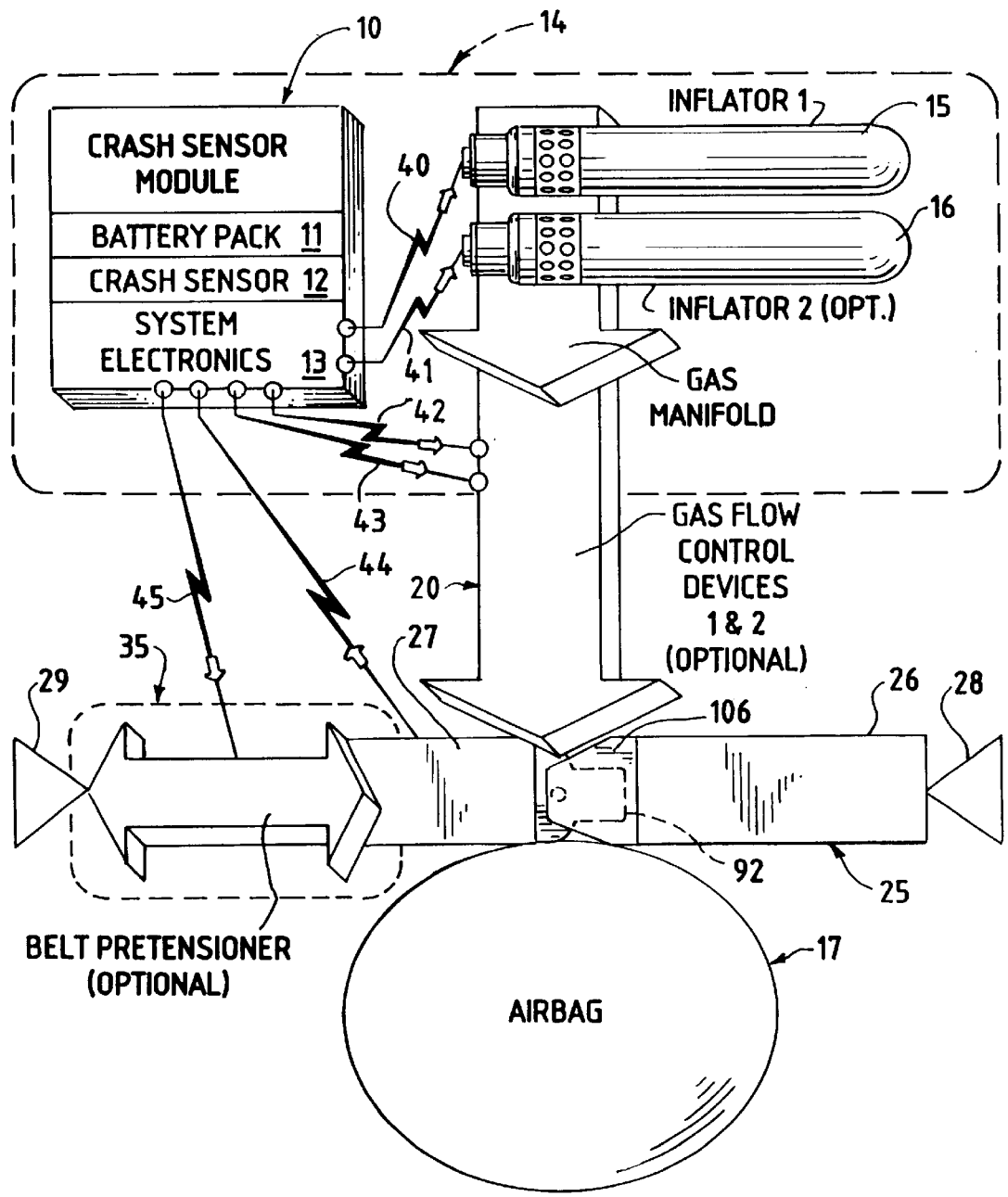
FIG. 1 is a general schematic of the safety restraint system.

A general overview of the present passenger vehicle restraint system, including power and logic system is presented in FIG. 1, in which numeral 10 identifies what is referred to as a crash sensor module. Module 10 is comprised of a dedicated battery power supply 11 which is completely independent of any other vehicle power source, such as a vehicle prime battery or generator. A dedicated, independent power source is provided for each individual occupant seat, so that actuation of the protective restraint airbag will be effected even though a catastrophic event may occur to the vehicle. In crash events, for example, the electrical sources and systems that are used for general vehicle operation cannot be reasonably relied upon in such emergency situations. Dedicated battery power supply 11 may preferably take the form of a lithium battery or any other battery made of materials which have performance levels and service lifetimes commensurate with realistic operational requirements. Battery supply 11 may be advantageously made up of multiple dedicated battery units, should that arrangement be indicated in any given installation. In the present instance the use of two battery units has been found to be of particular effectiveness when placed in series with each other and circuited to provide at least two different voltage levels available to the system.

A crash sensor 12 is included as part of module 10 and usually takes the form of an accelerometer that is responsive only to accelerative (or decelerative) forces acting along a single axis that is substantially parallel to the direction of travel of the vehicle. System reliability can be improved by employing two accelerometers that act in identical manner to provide system redundancy. Similarly, a sensor array comprised of three or more individual sensors can be used to render the system responsive to forces that are not aligned identically to the axis of vehicle travel. For example, an array containing three sensors could be deployed to sense impacts occurring within ±10° of the direction of travel.

The type of crash sensor advantageously incorporated into the present system is of the Hall effect type that consists of a Hall effect transducer and a spring loaded magnet. The magnet moves within a tube during a deceleration event, creating an electrical signal proportional to the severity of the event, which signal can be used to trigger related apparatus that ultimately cause deployment of the airbag. Module 10, including components 11, 12 and 13 are mounted within an electromagnetic shielding or protective cover 14 and crash sensor 12 is mounted in position within protective housing 14 through elastic shock absorbing gaskets or pads (not shown) to dampen the effect of any extraneous forces that could arise from accidental blows to the housing, as from luggage or the like. The crash sensor signal will, in the preferred operation, be compared to other, stored, values so that it can initiate bag deployment only when a predetermined threshold value is created. The crash sensor comprised of the Hall effect device is uniquely adapted to elimination of signals generated by externally applied forces that are not aligned with the direction of magnet travel and where high frequency response may be detrimental.

The third part of the crash sensor module 10 shown in FIG. 1 is designated as the system electronics 13. System electronics 13 includes a micro processor and suitable programming that imparts logic capability to perform diagnostic and signal functions to initiate bag inflation once a proper signal is received from the crash sensor. The electronics control a firing circuit that provides the electrical pulse that fires the inflator initiator, commonly referred to as a squib. All electronics circuitry, batteries and microprocessor chip reside on an electronics board contained within protective housing 14 that isolates them from and prevents transmission of extraneous electromagnetic radiation, such as radio frequency waves and the like. When used in conjunction with commercial aircraft the shielded enclosure with the electronics would be usually secured to a rigid plate mounted to rigid structure beneath each passenger seat. Shock absorber mounting may be used to isolate the sensor from transients generated within the aircraft, which may be transmitted through the seat frame.

Referring again to FIG. 1, there are illustrated two inflators 15 and 16 which supply gas to the airbag 17 through gas flow path 20. Although two inflators 15 and 16 are shown, it will be appreciated that these are illustrative only, since one inflator or more than two inflators can be used if desired. Inflation can be effected in sequential fashion through the application of multiple inflator circuitry to provide staged bag inflation, should this type of inflation process be desired. Alternatively, gas flow control devices, such as valves controlled by the system electronics can also provide a more gradual increase in bag inflation than would generally be possible when utilizing a single inflator having no flow rate control mechanisms.

Figure 3:
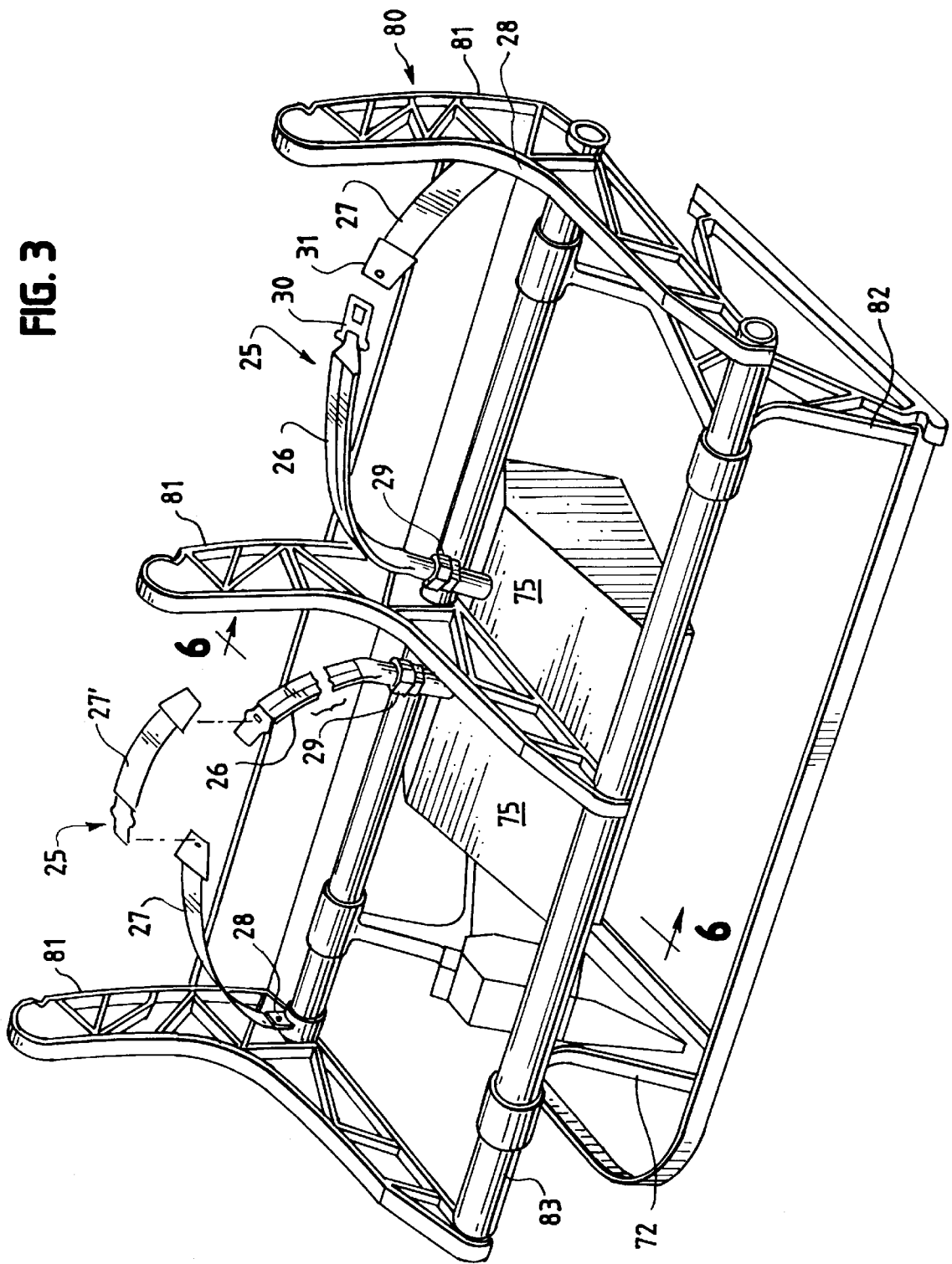
FIG. 3 is a front perspective of a typical aircraft seat frame showing a belt of this invention attached to it and showing the mounting location of the crash event sensor, electronics and inflator.

Seat belt 25, (see FIG. 3) which is discussed in detail below, is comprised of a first buckle tang carrying part 26 and a second tang receiving buckle carrying part 27. The ends of each belt part opposite the buckle and tang are secured to vehicle sub-structure at points 28 and 29, respectively. The two belt parts 26, 27 have a fastening buckle 31 and a fastening tang 30 mounted on the unsecured ends so that the belt parts 26, 27 can be joined about the user's body. FIG. 1 illustrates that the present restraint system can be provided with an optional pre-tensioning device 35 that functions in a known manner to remove slack from the belt 25 upon deceleration prior to deployment of airbag 17. The lines 40 through 45 that are drawn between the system electronics 13 of crash module 10 show, as indicated by the direction of the arrows, the fashion in which commands are communicated between the system electronics and the other parts of the restraint system.

Figure 2:
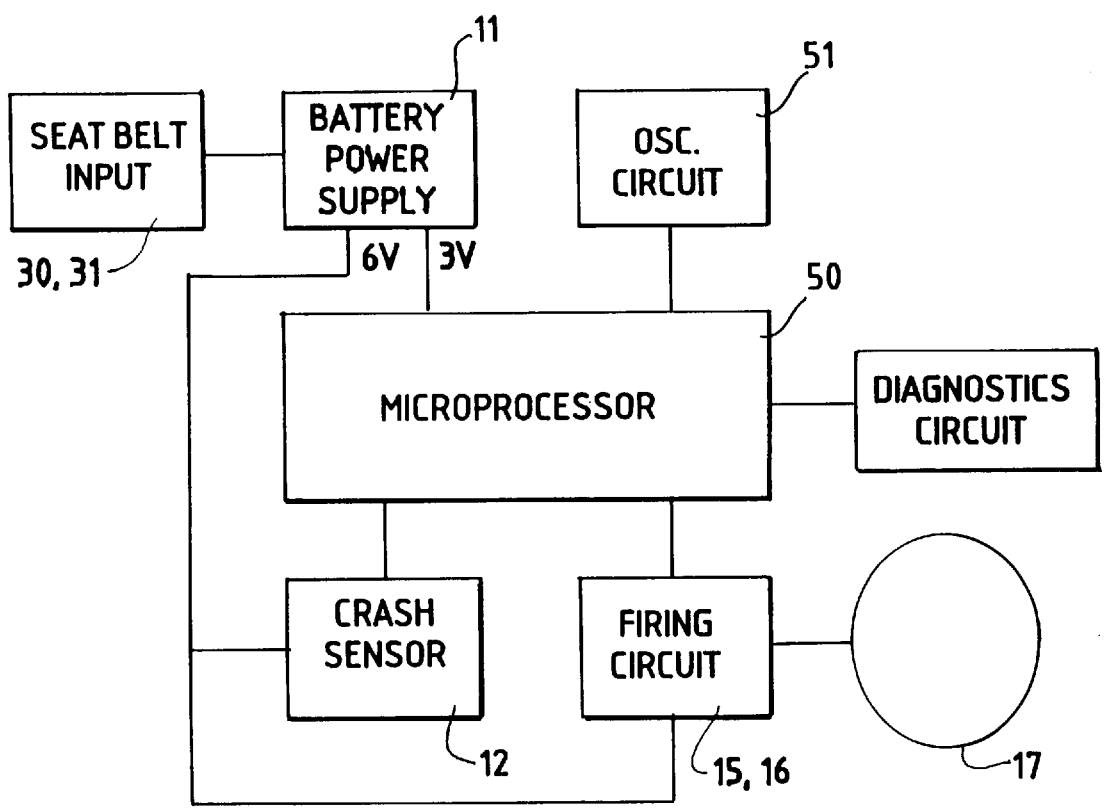
FIG. 2 is an electrical schematic of the electronic control and firing systems.

The system electronics can be better understood by reference to FIG. 2 of the drawing where the number 50 identifies an integrated circuit chip or microprocessor that is programmed to receive various input values, analyze the values and output appropriate command signals, as required. A microprocessor such as the Motorola MC60 HC705K1 may be used in this application. In the embodiment illustrated, the battery pack 11 will have two batteries which are joined in series in order that two voltages can be available for operation of the restraint system protective devices. Each battery may be a 3 volt cell which, when serially connected, provides both a 3 volt and a 6 volt output. Battery pack 11 provides 3 volt power for operation of microprocessor 50 in carrying out its logic function as well as 6 volt power to initiate the firing of the circuitry with inflators 15 and 16.

Crash sensor 12 advantageously utilizes two or more Hall effect units to generate the signals used by the logic system of microprocessor 50 to determine whether the signals are or are not representative of those that would arise from a crash event. As mentioned earlier, multiple sensors are not required for event sensing but the provision of multiple sensors provides greater reliability and specificity in reaction to crash events not totally aligned to the vehicle path of travel. Specifically two sensors may, if desired, enable determination of the shape of the deceleration curve so that discrimination between true crash events and unwanted transient effects such as local luggage impacts can be made; thus, inadvertent airbag deployment can be prevented.

The electronics in the system are not activated until the belt parts 26 and 27 are connected by joining tang 30 and buckle 31, which connection provides the seat best input identified in FIG 2. For purposes of enabling the system, fastening elements 30, 31 contain switch elements (described below) that when joined act to close circuit connections between battery pack 11, crash sensor 12 and system electronics 13. Thus, if the fastening elements 30 and 31 remain apart, the switch elements preclude the supplying of power from battery pack 11 to the remainder of the operating components. Inactivation of battery pack 11 preempts accidental operation and also saves battery power during periods when not required.

There are certain instances when it is desired to remove the airbag from operation such as, for example, when a seat is occupied by an infant or by a person of substantial girth. In these instances an extra length of belting material 27' can be connected between elements and 31 and the firing circuitry will remain open and inoperable. In this mode of operation, the belt structure serves as the sole safety restraint. The application of an extra belt length 27' to separate belt parts 26 and 27, and thereby switch elements on fastening elements 30 and 31, is illustrated on the left side when viewing FIG. 3.

Battery service life is a crucial aspect to a system that is to operate with no other source of operating power. In the preferred construction of this invention means have been designed into the operating system which minimize overall operating power requirements and the time of operation and thereby effectively extend battery service life. As delivered from the battery power pack 11, power savings is obtained by utilizing one battery to operate the digital electronics and using both batteries to meet sensor and firing circuit requirements.

Power is made available to the system by closing reed switch elements located on tang 30, whereby power is applied to the Hall effect sensor 12 from oscillator circuit 51 and microprocessor 50. After applying power to the sensor, the microprocessor 50 waits an adjustable time period for the Hall effect sensor to stabilize and then polls the sensor using a discrete input to determine if a deployment event is occurring. If sensor 12 is inactive then the microprocessor powers down and the system enters a low current "wait" mode. After a preselected time period, the microprocessor controlled oscillator 51 powers up and the cycle repeats. The operation involves supplying discrete pulses to the Hall effect sensors, waiting for sensor stabilization and then polling the sensors to determine whether or not crash event conditions are present. If the microprocessor receives an input from sensor 12, the circuit stays on and the sensor is continuously monitored. If the active state remains for a preselected, adjustable threshold time the microprocessor activates bag deployment. By utilizing this on-off mode of operation, the service life of the dedicated batteries can be lengthened to the point where the system attains commercial viability. For example battery sources have expected use lifetimes of 4 to 6 months can be extended to 2.5 to 3.0 years or more of continuous 24 hour per day use.

Figure 4:
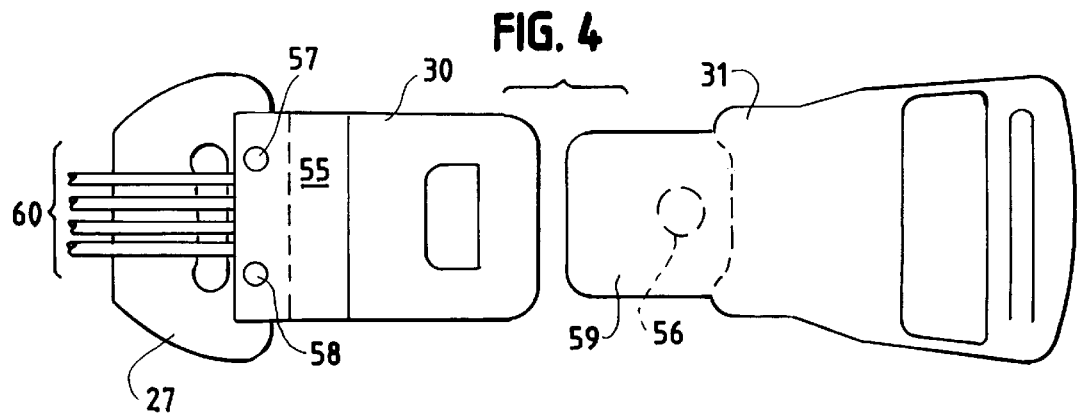
FIG. 4 is a bottom elevational of the improved belt buckle and belt tang of this invention.

Referring to FIG. 4 of the drawings, the tang 30 and buckle 31 are shown in more detail to indicate the exact nature of the construction utilizing the reed switch that must be closed before the seatbelt input to the electronics is placed into operative condition. Tang contains a double reed switch 55 which is closed by inserting the tang 30 into the buckle 31 in order that the battery pack 11 can be placed into the circuit to power up microprocessor 50. Two contacts are used in the double reed switch to provide system redundancy that delivers increased service reliability. Contained in buckle 31 is a magnet 56 that acts to close the reed switch 55 when tang 30 is inserted into buckle 31. Also present in tang 30 and located to the left of reed switch 55 is an infrared sensing photo-voltaic cell 57 and a bicolor light emitting diode 58. When the tang and buckle are placed into mating relationship the extension 59 on buckle 31 extends outwardly a distance far enough to cover both the cell 57 and the LED 58. As an additional belt orientation safety feature, it can be seen in FIG. 4 that since extension 59 extends past reed switch 55 it is physically not possible for the tang and buckle to be joined if improperly oriented with respect to each other. Numeral 60 designates the circuit wires that extend along belt portion 27 both from cell 57, LED 58 and reed switch 55 to connect these elements into the microprocessor 50. The infared sensing photo-voltaic cell 57 and the LED 58 are part of diagnostic circuitry that will be discussed more fully hereinafter.

It will be appreciated that the buckle and tang both must be oriented facing outwardly, away from the users body. If the orientation of both elements is not such that bag 17 faces away from the body, the reed switch 55 will not be closed by magnet 56 and the safety system will remain inoperative. FIG. 4 shows the belt 27 and wires 60 which connect the double reed switch 55, the IR cell 57 and the LED 58 to the microprocessor 50.

Figure 5:
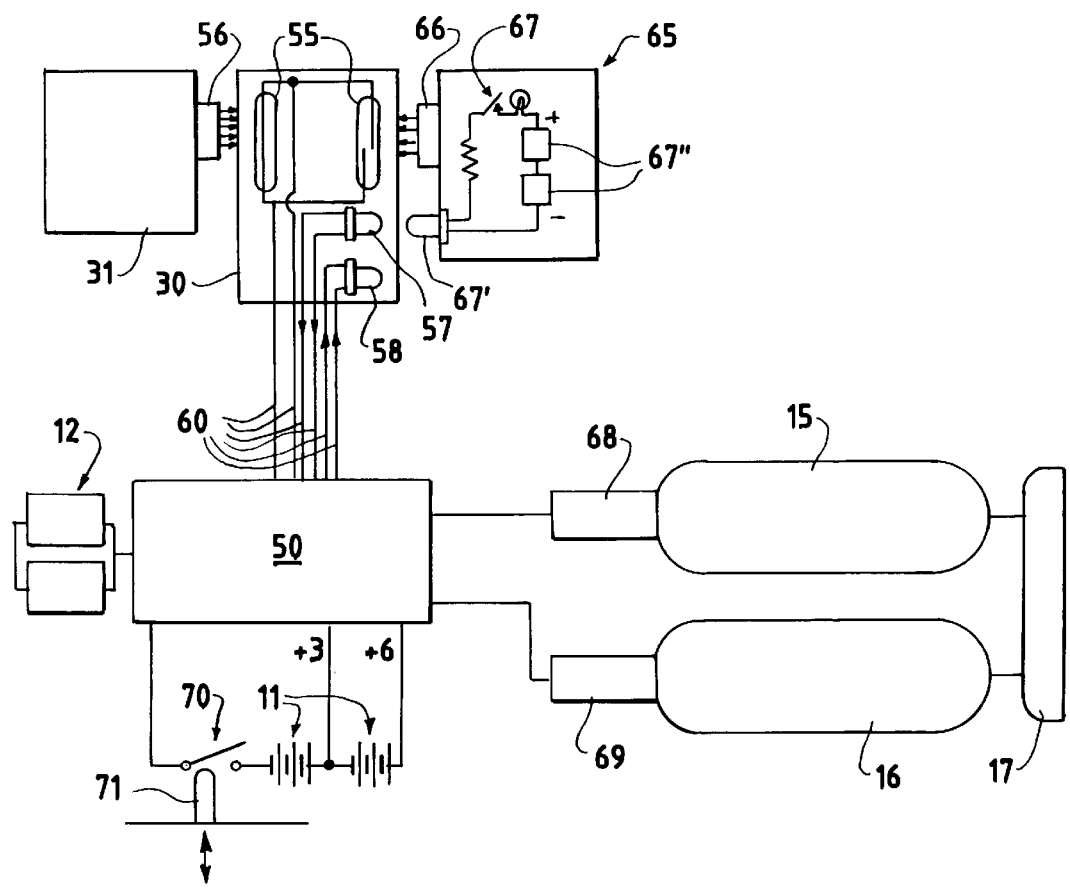
FIG. 5 is a schematic of the inflator and electronic system.

Referring now to FIG. 5, the drawings here show system circuitry and electronics, as well as the method by which a test wand 65 (illustrated diagrammatically) can be used to verify the integrity of the various parts of the sensing and firing circuitry. Specifically, test wand 65 is carried by personnel who desire to check the condition of the safety system circuits. To this end magnet 66 on wand 65 is placed in position adjacent to reed switch 55 to effect closing of that switch in the same fashion as magnet 56 would if the tang 30 and buckle 31 were joined. It is preferred that magnet 66 be somewhat weaker than the magnet 56 which is contained in the tang of seat belt 27 so that if the test magnet 66 effects closure of switch 55, then it is known that the magnet 56 will effect similar closure. With reed switch 55 closed, through insertion of the magnet 66 into buckle 31, operating switch 67 is closed and infrared emitter 67' is energized by batteries 67" located in the wand. Radiant energy from the infrared emitter 67' is received by infrared sensing photo-voltaic cell 57 which then causes activation of an appropriate sensing circuit in the microprocessor 50. If all of the system electronics are in operating condition, the LED 58 will show green or, if the circuitry is for some reason not operating properly, a red fail condition shows.

Since the protective restraint system utilizes an inflation device as part of the operative system, provision has been made for disarming the system so that it can be safely transported for maintenance or relocation, without incurring accidental operation. Specifically in FIG. 5 of the drawings, the batteries 11 that would cause firing of squibs 68 and 69 are circuited with a safing switch 70 that is held in the open condition by an arming/disarming pin 71 when the safety system electronics is positioned beneath a seat during for normal in-service operation. When the module 10 and related components are removed for maintenance, replacement, or for any other reason, the switch 70 automatically closes and shorts out the resistive firing devices that are contained in the squibs 68 and 69. Switch 70 could be designed to operate in reverse fashion, that is to activate squibs 68 and 69 when in a normally closed condition, but the structural tolerances required to assure continued, efficient operation render this mode of operation somewhat less desirable.

Indicated earlier was the fact that the present passenger restraint system was especially applicable to aircraft use. To better understand the system as applied to aircraft reference is again made to FIG. 3 of the drawings in which the numeral 80 identifies the basic frame work of a typical seat framework structure used in commercial passenger aircraft. Broadly, the frame 80 is comprised of upper support brackets 81 and lower support brackets 82. Brackets 81 and 82 are mounted on elongated horizontally extending tubes 83 and are spaced as required to form areas for seats and to support and secure the framework to the aircraft floor. The seat framework (and fully cushioned seats) is removable from attachment to the floor for relocation, removal and for any other reason.

The protective system is provided with crash event sensing devices, a gas supply and an independent power source, all of which are contained in protective housing 85 mounted on framework 80. Protective housing 85 can be attached to the underside of the frame that supports the passenger seat or attached to the seat spreader bar assembly by any suitable means. Housing 85 can be understood better by referring to FIG. 6 of the drawings where numeral 86 identifies a rigid mounting plate that is secured to the seat structure. It is required that plate 86 be rigid to obtain proper sensing of a crash event through the seat structure. A cover shield or housing 87 which includes an upper closure plate 88 is attached to plate 86 and together they define an enclosed volume 89 that holds the other components of the safety system. Specifically, within volume 89 are located the event sensor 12, with accompanying electronics, independent power supply 11 and inflators 15, 16. The crash sensor 12 is the trigger for the inflation event and through its mounting location on plate 88 it senses fore and aft deceleration of the vehicle. When it senses a preset energy value as a result of deceleration, it triggers to an inflator initiator (squib). As explained earlier, the sensor used in this invention is a "single point" sensor utilizing the Hall effect, that consists of a Hall effect transducer and a spring loaded magnet, which acts as a single axis accelerometer, all as set forth earlier. The magnet moves within a tube during a deceleration event, creating an electrical signal proportional to the severity of the event, as when a given energy value is exceeded as a result of deceleration, triggering the firing circuit at the appropriate time. The sensor is positioned to receive input fore and aft to sense a crash event, and will not sense other inputs such as turbulence which are in an off-axis direction. Additionally, the sensor mechanically filters out higher frequency inputs, which simplifies the required algorithm and increases reliability. For greater reliability, more than one Hall effect sensor may be employed to confirm an actual crash event prior to bag deployment.

The independent battery system employs two separate batteries in battery pack 11 to power the firing circuit and to power the diagnostic control circuit independently. One battery powers either a hybrid or integrated circuit control chip or microprocessor 50 which requires a low level current and provides the necessary logic to analyze the signal received to determine whether deployment is or is not required. Both batteries are used to power the firing circuit by providing the 6 volts required.

Also in cover assembly 85 are inflators 15 and 16 (only one being shown) which are electronically connected to event sensor 12 by electrical leads 96. The electronics, battery, inflator and sensor are protected by the housing cover shield 87 from the environment under the seat pan of the passenger seat. Housing 87 is preferably an injection molded or vacuum-formed part incorporating electronic and magnetic shielding to suppress interference that may affect the igniter or electronics and sensor. The inflators 15 and 16, which can be filled with any substantially inert gas such as air, nitrogen, helium, argon, etc., provide the gas output to inflate the bag located in the non-extensible belt portion 27, in a manner well known in the art. Gas can also be provided by a gas generator, as well as stored. The compressed or generated gas is created by a pyrotechnic initiator that heats stored gas or triggers a reaction, all as known in the art. The gas will be released in a controlled manner upon receiving a firing signal originating from the event sensor 12.

A gas tube 100 constructed of any suitable material extends from the inflator upwardly alongside the passenger seat toward the end of the non-extensible belt portion 27. A gas coupling 101 and an electric coupling 102 for conductors 60 are provided in order that the belt portion 27 can be disconnected from inflators 15 and 16 to permit maintenance or replacement of the seat belt (and belt components) or of the housing 87 and the components situated therein.

One form of a construction of a belt 25 can be seen by referring to FIGS. 7, 8 and 9 of the drawings. Referring first to FIG. 7, there is illustrated the non-extensible part 27 of the safety belt. It comprises a length of webbing 105 which is of the type normally used in vehicle safety restraint systems. A fitting 106 is secured to the webbing at one end for fixedly attaching that end of the belt to the underlying seat substructure at tubing 83 and the opposite end of belt part 27 contains a tang 30 that cooperates with a suitable buckle 31 on the belt portion 26 (see FIG. 8). The belt part 27 further comprises an airbag assembly 110 that is contained inside a cover assembly 111 and is attached directly to the fixed length of the belt on the side away from the user. Bag 17 within assembly 110 is constructed of an appropriate material, usually a tightly woven fabric, with or without an impermeable coating, depending upon performance requirements. The bag 17 will be of sufficient volume after inflation to restrain the upper body from excessive forward movement during a crash event.

To supply air or other gas to the gas bag 17 from the gas tube 100 a gas supply tube 115 is positioned adjacent a surface of web 105 and is permanently connected through an intermediate connection, to the end of air tube 100 at one end and to the airbag 17 at the other. This gas path is contained inside the cover assembly 111 and unfolds and expands when the inflaters 15, 16 discharge gas into the system. The supply tube 115 is shaped to provide as much occupant comfort and flexibility as possible, while still retaining its primary function of conveying gas to the bag 17. Supply tube 115 may be substantially flat but probably cannot be totally flat since the interior gas passage must be large enough to accept the pulse of gas arising when the inflators 15, 16 are operated. Also contained within the cover assembly 111 is a belt orienting device, 116, which resists torsional bending of belt and maintains the non-extensible part 27 in a position in which bag assembly 110 is always positioned in a direction away from the user's body. Stiffener 116 extends substantially the entire length of belt part 27 and is therefore of greater length than thickness and may be any type flexible strap that resists torsion, such as shipping pallet strap material or the like. Stiffener 116 will allow the belt to wrap around the occupant comfortably, yet resist twisting of the assembly about the long axis. Other systems can be provided to assure the desired belt orientation, depending upon the facts attending individual usage requirements. Stiffener 116 may also be pre-formed to incorporate a slightly bowed or arcuate curvature that assists positioning of the belt about the user's torso. The stiffener orienting strap 116 assists in avoiding the potential placement of an airbag assembly 110 in a hazardous position facing towards the seat occupant and may be sewn directly to the web 105 or placed in a pocket sewn to the web, or placed inside a hollow belt assembly. Depending upon the required stiffness in system, stiffener 116 may be attached directly to either the belt attachment shackle 106 and/or the tang 30 in addition to the fabric belt.

Cover assembly 111 is provided to contain the folded airbag 17 on the belt during the life of the product and opens at predetermined locations to release the inflating bag during a crash event. Cover 111 is a protective barrier for the bag material and also a decorative element of the system. The cover which is permanently attached to the belt at one point throughout an entire crash event is designed to tear open at selected areas through means such as selectively weakened areas of the cover material.

The final element on belt part 27 is the tang 30 on which is mounted the dual reed switch 55 the infrared sensor 57 and the LED 58. Buckle 31 on belt part 26 contains a magnet 56 which acts upon the reed switch 55, to close the circuit when the buckle and tongue are joined. If the buckle and tongue are rotated 180° out of proper relationship with respect to each other, the system will not be activated, thereby preventing a potentially hazardous use situation. This orientation assurance is in addition to that provided by belt orienting element 116, which also acts to make sure that the orientation of the non-extensible portion 27 is such as to keep the inflatable bag assembly 110 always directed away from the body of the user.

Figure 10:
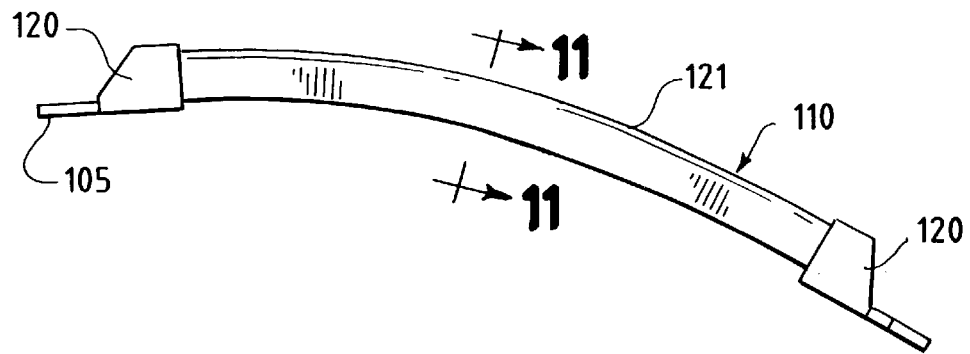
FIG. 10 is a side elevation showing one means for mounting an airbag on a belt.
Figure 11:
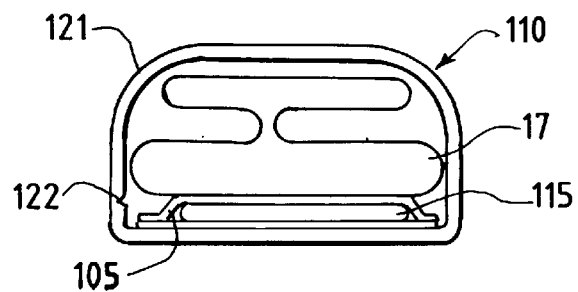
FIG. 11 is a sectional view taken along the line 11—11 of FIG. 10.

FIGS. 10 and 11 illustrate one method by which the bag assembly 110 can be secured in operative position on the non-extensible belt portion 27. Referring first to FIG. 10 it can be seen that the bag assembly 110, which includes the expansible bag 17 and cover 121, can be secured on the belt webbing 105 between caps 120. The bag 17 can be seen in FIG. 11 in its folded and stored position and also seen is the gas supply tube 115 and the belt webbing 105 which has been shaped to receive the supply tube 115. The bag 17 sits immediately atop the web 105 and gas tube 115 combination and is folded in the manner illustrated. Surrounding the entire belt assembly is an extruded polymer sleeve 121 that extends completely between anchor caps 120. Sleeve 121 slides over the bag and belt assembly and the caps 120 are then placed and secured in position to seal off the entire bag assembly. Polymer sleeve 121 can be notched as shown at 122 to provide a weakened area that will rupture and permit the gas bag 17 to expand when required.

Figure 12:
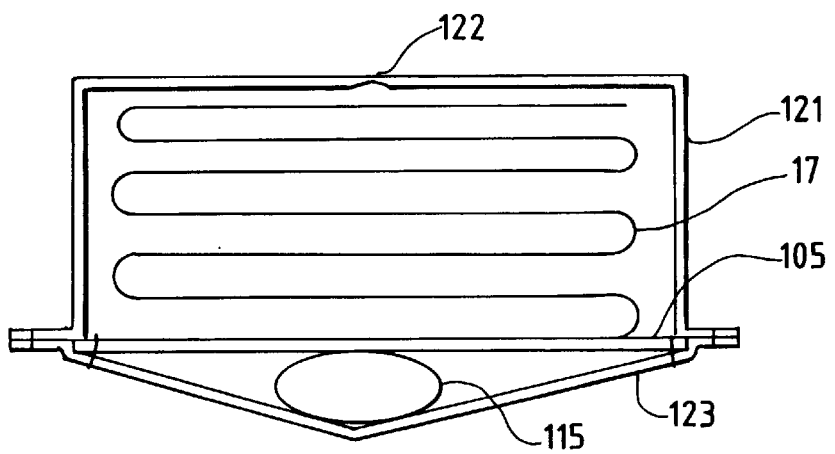
FIG. 12 is a cross-sectional view of an alternative bag/belt construction.

FIG. 12 shows a cross-sectional view through another configuration of bag and belt assembly, specifically, bag 17 is contained within a cover which can be similar to the polymer sleeve 121. Sleeve 121 is fastened by suitable means such as rivets, sewing or the like to a belt assembly comprised of web 105 and a backing 123. The web, backing and cover sleeve 121 are all joined along their longitudinal edges in the manner indicated. Within the space between cover 123 and belt web 105 is the gas supply tube 115. In this instance the supply tube 115 is of ovate shape so that the horizontal axis of the tube is greater than the vertical axis. By shaping the supply tube in this fashion, the tube may contribute in the manner of stiffener 116 to maintain the necessary orientation of the bag 17. In this assembly, the bag 17 is folded and cover 121 is placed over the bag and the cover is sewn to the backing 123. This allows a tamper-proof sealed assembly that maintains the integrity of the system and precludes damage to the inflatable bag 17. To provide for deployment of the bag, the upper surface of cover 121 is provided with a notch 122 similar to that described in connection with the configuration illustrated in FIG. 11. The weakened part of the cover is shown on the top surface, but may be placed advantageously in additional locations, when desired.

The gas supply tube 115 is, as already mentioned, connected at one end to the tube 100 that comes from the gas sources 15 and 16. FIG. 13 shows the manner in which the gas is ultimately deployed into the bag. Specifically the supply tube 115 comes from the point at which the gas is being supplied from inflators 15, 16 through the belt webbing 105 and into a diffuser 125 which is located immediately beneath the location on the belt 27 where the bag 17 is located. It will be noted that the diffuser 125 is shaped with a right angle bend so that the high pressure gas coming through supply tube 115 must change direction and be diffused into the bag 17 with less force than would otherwise occur. The diffuser 125 extends into the bag which is mounted above it and is held in place by a spacer 126 and a retainer, such as a snap ring 127. A diffuser fitting 128 is mounted at the exit end of diffuser 125 and is formed with a plurality of side and upward facing openings 129 to diffuse and thereby reduce the velocity of the gas as it enters the bag 17. Other types of gas diffuser fittings may be used.

In connection with the description of the circuitry illustrated in FIG. 5, it was earlier noted that the electronic circuit contained a disarming switch 70 which was held in a normally open position by means of an arming pin 71. FIG. 15 of the drawings shows structure by which the apparatus of this invention can be mounted beneath an aircraft seat structure in a way in which the entire electronic and gas containing housing 85 can be removed or installed in an efficacious and safe fashion. Once the housing 85 is installed under the passenger seat the switch 70 is absolutely inaccessible to anyone, other than authorized service personnel. Specifically, all of the electronic controls 50, sensors 12, inflators 15 and 16 are contained in the housing 85 as previously discussed in connection with FIG. 6. The upper part of the enclosure is sealed with the closure plate 88 similar to that disclosed in FIG. 6. In this instance there is an opening 130 in the plate 88 into which the arming pin 71 will be inserted when the entire assembly is secured, to mounting plate 86 that is in turn secured by clips 131 to the horizontally extending tubes 83 that form part of the seat sub-structure. Plate 88 is attached to plate 86 by means of any sort of tamper proof attaching devices, illustrated diagrammatically by numbered 132. When the complete electronic and inflating assembly is removed by qualified personnel from the bottom of a seat, the arming pin 71 is removed from its relationship with the system disarming switch 70, which goes from an open to a closed position and eliminates the firing capability of the squibs associated with the gas inflators 15 and 16. Conversely when the enclosure and its contents are anywhere other than in assembled operating position on the vehicle seat, the system is incapable of firing and therefore is completely safe for handling.

While this invention has been described as having certain preferred features and embodiments, it will be understood that it is capable of change and modification within the scope and spirit of the invention and this invention is intended to cover all modifications, additions and variations that fall within the spirit of the invention and within the scope of the appended claims.

We claim:

1. A restraint system for protecting vehicle passengers during a crash event comprising:
    (a) a vehicle seat including a substructure frame attached to the vehicle;
    (b) a safety belt having a first non-extensible part and a second extensible part, wherein one end of each belt part is attached to the vehicle seat sub-structure for extension from the points of attachment to the substructure frame across a passenger's lap;
    (c) fastening structures on ends of the belt parts non-attached to the substructure for uniting the parts over the passenger's lap;
    (d) an inflatable member mounted on the non-extensible part of the belt on that side facing away from the passenger's lap;
    (e) belt position orienting means operatively associated with the non-extensible belt part for maintaining the inflatable member mounted thereon facing away from the passenger's lap;
    (f) a restraint system battery power supply which is independent of any other vehicle power source;
    (g) an electrical switching combination contained in the belt part fastening structures that permit activation of the inflatable member only when the inflatable member is positioned facing away from the passenger's lap;
    (h) a source of inflating gas operably joined to the inflatable member;
    (i) a crash event sensor, and
    (j) system electronics mounted on the seat substructure frame for electrically interconnecting the crash event sensor, the source of inflating gas, the battery power supply and the electrical switching combination.

2. A vehicle restraint system for protecting vehicle passengers during a crash event comprising:

(a) a vehicle seat including a substructure frame attached to the vehicle;
(b) a safety belt having a first non-extensible and a second extensible part, each attached at one end to the vehicle seat substructure frame and across a passenger's lap;
(c) fastening structures on ends of the belt parts non-attached to the substructure for uniting the parts about the passenger's lap;
(d) an electrical switching combination contained in the belt part fastening structures;
(e) an inflatable member attached to the belt;
(f) a source of inflating gas operably joined to the inflatable member;
(g) a restraint system battery power supply which is independent of any other vehicle power source;
(h) a crash event sensor;
(i) system electronics electrically interconnecting the crash event sensor, the source of inflating gas and the battery power supply and regulating the supply of power from the battery to the event sensor to discrete pulses of preselected duration.

3. A vehicle restraint system as defined in claim 1 or 2 wherein the system electronics, is contained within a radiant energy shielding housing supported by the vehicle seat frame.

4. A vehicle restraint system as defined in claim 1 wherein the system electronics includes switching means connected between the system battery power supply and the source of inflating gas for rendering the system electronics operable when it is mounted on the substructure frame.

5. A vehicle restraint system as defined in claim 4 wherein a switching means operator separate from the switching means is supported by the seat frame in position for activating the system electronics when the electronics are mounted on the seat frame.

6. A vehicle restraint system as defined in claim 1 wherein the electrical switching combination in the belt fastening structures comprises at least one reed switch mounted on one belt part and a reed switch operator mounted on the other belt part.

7. A vehicle restraint system as defined in claim 6 wherein the restraint system includes an extra belt part for disabling connected between the reed switch and the reed switch operator attached to the extensible and non-extensible belt parts, the system electronics.

8. A vehicle restraint system as defined in claim 6 wherein the reed switch operator is a magnet.

9. A vehicle restraint system as defined in claim 6 wherein: the fastening structures include a coupling tang and a buckle and the reed switch is mounted on the coupling tang secured to the end of the first belt part and the reed switch operator is carried in the buckle secured to the end of the second belt part.

10. A vehicle restraint system as defined in claim 6 wherein at least two reed switches are mounted on the one belt part.

11. A vehicle restraint system as defined in claim 1 wherein the source of inflating gas and the system electronics include structure for enabling introduction of gas into the inflatable member at predetermined controlled rates.

12. A vehicle restraint system as defined in claim 1 wherein the restrained system battery power supply comprises at least two individual batteries connected for providing the system electronics with at least two levels of voltage.

13. A system as defined in claim 12 in which the batteries are connected in series.

14. A vehicle restraint system as defined in claim 1 wherein multiple sources of inflating gas are provided and the system electronics includes a firing program for effecting release of gas into the inflatable member in a preselected manner.

15. A vehicle restraint system as defined in claim 1 wherein the belt position orienting means comprises a torsion resisting element which is attached to the non-extensible belt part carrying the inflatable member.

16. A vehicle restraint system as defined in claim 15 wherein the belt position orienting means is a gas supply tube shaped for maintaining the belt part in position with the inflatable member facing away from the user's lap.

17. A vehicle restraint system as defined in claim 15 wherein the torsion resisting element is a substantially flat strap.

18. A vehicle restraint system as defined in claim 1 wherein the fastening structures on the ends of the belt parts non-attached to the substructure include physical means permitting connection therebetween only when the inflatable member is facing away from the passenger's lap.

19. A vehicle restraint system as defined in claim 18 wherein the physical means comprises an extension on one fastening structure for reception into a position orienting opening on the other fastening structure.

20. A vehicle restraint system as defined in claim 1 wherein belt position orienting means comprise the electrical switch combination contained in the belt part fastening structures.

21. A vehicle restraint system as defined in claim 1 wherein the crash event sensor is an accelerometer for generating a crash event output signal proportional to the rate of change in vehicle speed.

22. A vehicle restraint system as defined in claim 21 wherein the accelerometer incorporates a Hall effect device.

23. A vehicle restraint system as defined in claim 21 in which the accelerometer produces a signal only in response to changes in speed occurring along a single axis substantially parallel to the path of travel of the vehicle.

24. A vehicle restraint system as defined in claim 21 in which at least two accelerometers are used for producing the crash event output signal.

25. A vehicle restraint system as defined in claim 1 in which the system electronics include a gas firing circuit and a separate system control circuit.

26. A vehicle restraint system as defined in claim 25 in which the gas firing circuit and the system control circuit operate at different voltages received from the battery power supply.

27. A vehicle restraint system as defined in claim 2 wherein the system electronics includes a microprocessor that is programmed to poll the crash event sensor, recognize a crash event and initiate deployment of the inflatable member.

28. A vehicle restraint system as defined in claim 2 in which the system electronics include a gas firing circuit and a separate system control circuit.

29. An apparatus for controlling the operation of passive vehicle passenger restraint systems utilizing an inflatable cushion and a source of inflating gas, the apparatus comprising:
(a) a sensor responsible for transmission of a signal output reflecting the occurrence of a crash event;
(b) a restraint system battery power supply which is independent of any other vehicle power source;
(c) system electronics electrically interconnecting the crash event sensor and the battery power supply, which system electronics includes logic means programmed for regulating the supply of power from battery to the event sensor to discrete pulses of preselected duration; and (d) a housing enclosing at least the sensor, battery power supply and system electronics for shielding out radiant energy.

30. An apparatus as define in claim 29 wherein the system electronics includes a microprocessor and an oscillator circuit connected for providing a timed energizing pulse to the sensor.

31. An apparatus as defined in claim 30 wherein a source of inflating gas is located within the radiant energy shielding housing.

32. An apparatus as define in claim 29 wherein switching means is operably connected between the system battery power supply and the source of inflating gas, for rendering the gas source inoperative when desired.

33. A vehicle safety restraint system for passenger protection during a vehicle crash event comprising: (a) an inflatable body restraint member extendable across a user's body (b) a source of inflating gas operatively connected to the body restraint member; (c) a crash event sensor to initiate inflation of the body restraint member; (d) a restraint system battery power supply which is independent of any other vehicle power source; and (e) power supply control elements operably connected between the battery power supply and the event sensor, whereby power is pulsed from the battery power supply to the event sensor to sample the condition thereof at preselected discrete intervals.

34. A restraint system as defined in claim 33 wherein a safety switch is electrically connected to the battery power supply for selectively controlling its connection to the remainder of the power supply control elements.

35. A restraint system as defined in claim 33 or claim 34 wherein the power supply control elements for pulsing power to the sensing means comprise a microprocessor.

36. A restraint system as defined in claim 33 wherein the event sensor comprises a Hall effect device.

37. A restraint system as defined in claim 33 wherein the inflatable body restraint member comprises: a first, non-extensible belt part having an inflatable bag mounted thereon for expansion in the direction away from a user's body.

38. A restraint system as defined in claim 37 wherein the first belt part includes a belt position orienting element for orienting a preselected side of the first belt away from the user's body.

39. A restraint system as defined in claim 38 wherein the first belt part position orienting element comprises a torsion resisting element that maintains an initial, preferred first belt part orientation.

40. A restraint system as defined in claim 39 wherein the torsion resisting element extends substantially the entire length of the first belt part.

41. A restraint system as defined in claim 37 wherein the first belt part has two ends, one end being attached to selected substructure and the second end having a tang for connecting to a buckle, whereby the first belt part is secured at both ends over the lap of the user's body.

42. A restraining system as provided in claim 41 comprising a second belt part having two ends, one end being attached to selected substructure, and a buckle attached to the second belt part for releasable engagement with the first belt part tang, the second belt part being adjustable in length.

43. A restraint system as defined in claim 42 which includes an electrical switching combination in the tang and buckle which activates the safety restraint system when the tang and buckle are mutually engaged with the inflatable bag away from the user's body.

44. A restraint system as defined in claim 43 wherein the electrical switching combination comprises a reed switch and a magnet.

45. A restraint system as defined in claim 44 wherein the reed switch is mounted on the tang and the magnet is mounted on the buckle.

46. In a vehicle safety restraint system having an inflatable member attached to a safety belt, a source of gas, a crash event sensor and a source of battery power that is independent of any other vehicle power source, the combination comprising: electronic control means operably connecting the battery power source to the crash event sensor for regulating the supply of power from the source to the sensor into discrete pulses of preselected duration.

47. In a process for operating a vehicle safety restraint system having an airbag, a battery power source which is independent of any other vehicle power source and a crash event sensor, the steps comprising:

(a) providing a microprocessor programmed to control system operation, wherein the microprocessor:
  (i) applies power to the sensor for a time effecting stabilization thereof;
  (ii) energizes the sensor with a discrete power input to determine the condition of the sensor;
  (iii) powers down the system when no crash event is sensed and powers up the system when a crash event is sensed; and
  (iv) cyclically repeats the energizing and powering down of the sensor for as long as no crash event is sensed.

48. A process as defined in claim 47 wherein the microprocessor continues energizing the crash event sensor when it identifies a crash event.

49. A process as defined in claim 48 wherein the airbag is deployed after the event is identified.

50. A restraint system for protecting vehicle passengers during a crash event comprising:

(a) a vehicle seat including a substructure frame attached to the vehicle;

(b) a safety belt having a first non-extensible part and a second extensible part, wherein one end of each belt part is attached to the vehicle seat sub-structure frame for extension from the points of attachment to the sub-structure frame across a passenger's lap;

(c) a substantially flat stiffening element extending substantially the entire length of the non-extensible belt part for establishing a substantially fixed orientation of the belt part with respect to the passenger's lap;

(d) an inflatable member mounted on the non-extensible part of the belt on that side facing away from the passenger's lap;

(e) a belt position orienting means operatively associated with the non-extensible belt part for maintaining the inflatable member mounted thereon facing away from the passenger's lap;

(f) a restraint system battery power supply which is independent of any other vehicle power source;

(g) an electrical switching combination contained in the belt part fastening structures that permit activation of the inflatable member only when the inflatable member is positioned facing away from the passenger's lap;

(h) a source of inflating gas operably joined to the inflatable member;

(i) a crash event sensor; and (j) system electronics mounted on the seat substructure frame for electrically interconnecting the crash event sensor, the source of inflating gas, the battery power supply and the electrical switching combination.

51. An apparatus for controlling the operation of passive vehicle passenger restraint systems utilizing an inflatable cushion and a source of inflating gas, the apparatus comprising:

(a) a sensor responsible for transmission of a signal output reflecting the occurrence of a crash event;

(b) a restraint system battery power supply which is independent of any other vehicle power source;

(c) system electronics including (i) a microprocessor, (ii) and an oscillator and a firing circuit connected to the microprocessor, whereby discrete pulses of preselected duration are supplied to the event sensor; and (d) a housing enclosing at least the sensor, battery power supply and system electronics for shielding out radiant energy.

* * * * *